No. 778,578. PATENTED DEC. 27, 1904.
S. W. HAYES.
DERAILER.
APPLICATION FILED FEB. 13, 1904.

Witnesses
Edgeworth Greene
John J. McElhinny

Inventor
Stanley W. Hayes
By his Attorney
A. C. Kimball

No. 778,578. PATENTED DEC. 27, 1904.
S. W. HAYES.
DERAILER.
APPLICATION FILED FEB. 13, 1904.

Witnesses
Edgworth Greene
John J. McElhinny

Inventor
Stanley W. Hayes
By his Attorney
W. Kimball

No. 778,578. PATENTED DEC. 27, 1904.
S. W. HAYES.
DERAILER.
APPLICATION FILED FEB. 13, 1904.

Witnesses
Edgeworth Greene
John J. McElhinny

Inventor
Stanley W. Hayes
By his Attorney
H. G. Kimball

No. 778,578. PATENTED DEC. 27, 1904.
S. W. HAYES.
DERAILER.
APPLICATION FILED FEB. 13, 1904.

No. 778,578. PATENTED DEC. 27, 1904.
S. W. HAYES.
DERAILER.
APPLICATION FILED FEB. 13, 1904.

Witnesses
Edgeworth Greene
John J. McElhinny

Stanley W. Hayes Inventor
By his Attorney
H. C. Kimball

No. 778,578. Patented December 27, 1904.

UNITED STATES PATENT OFFICE.

STANLEY W. HAYES, OF GENEVA, NEW YORK.

DERAILER.

SPECIFICATION forming part of Letters Patent No. 778,578, dated December 27, 1904.

Application filed February 13, 1904. Serial No. 193,400.

*To all whom it may concern:*

Be it known that I, STANLEY W. HAYES, a citizen of the United States, and a resident of Geneva, county of Ontario, and State of New York, have invented certain new and useful Improvements in Derailers, of which the following is a full, clear, and concise specification.

The present invention relates to certain improvements in derailers of the type exemplified in Patent No. 693,544, granted February 18, 1902, to T. E. Lutz and myself as joint inventors, and which are also applicable with advantage to various other kinds of derailers and switching appliances, the object of the invention being the simplification of the construction and the increase of efficiency of derailers and track appliances which are adapted to be moved into and out of engagement with the rail, both in the respect of their operation and the facility of instalment; and further objects are to render the apparatus entirely independent of the rail, and consequently unaffected by its expansion and contraction, and to reduce the size and weight of such apparatus to a minimum without sacrifice of strength or durability.

The invention also involves numerous other features of advantage and importance in the formation and arrangement of the parts, whereby freedom and reliability of action are insured and the cost of manufacturing, installing, and maintaining reduced to a minimum, all as will be hereinafter fully described, and set forth in the appended claims.

Reference will be made to the accompanying drawings, in which—

Figure 4:
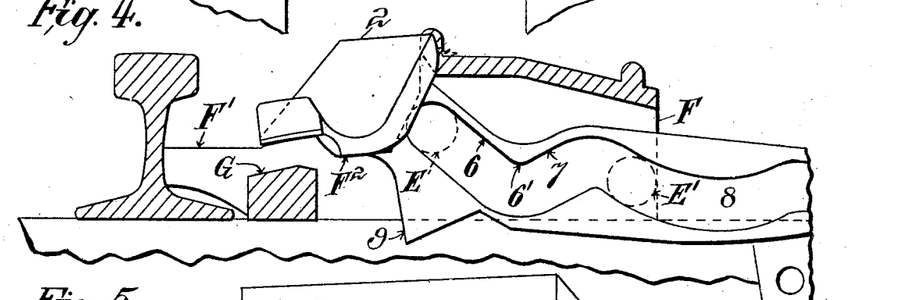
Fig. 4 is a longitudinal section of Fig. 1 with the wheel-derailing member in elevation in its closed or inoperative position.
Figure 5:
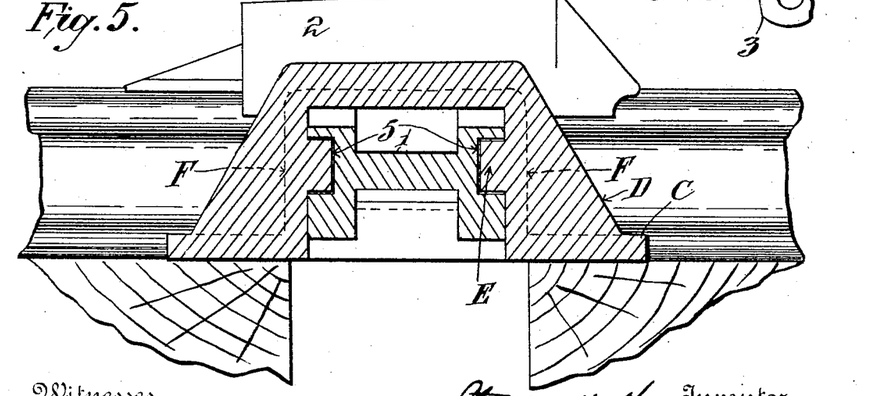
Fig. 5 is a vertical transverse section of Fig. 1 on line *a a*.

From the above figures it will be seen that the derailer is comprised of two parts—a standard member or base A and a wheel-derailing member 1, the latter being supported and slidably movable upon the former. The standard A is formed of a single piece or casting adapted to be secured permanently to the railway-ties or to other foundations adjacent the rail by means of spikes passing through suitable slots B in the flange or base-plates C. The upright side walls F F form between them a chamber or space opening transversely to the rail, within which the said wheel-derailing member 1 is contained and mounted. In Figs. 1 to 5 the chamber is shown made with a roof or closed top A', which is serviceable for protecting the movable part from obstruction or derangement, as well as for strengthening the side walls; but when reinforcement alone is required the part A' may take the form of a cross-bar. The bottom side may also be closed, if desired, either with or without the roof or cross-bar for more effectively protecting the operation and reinforcing the device. The side walls F F are disposed vertically or at right angles to the base-flanges C, but may of course assume other angles and shapes suiting the peculiarities of the locality in which the device is to be used. For the purpose of extra rigidity the walls are reinforced by the angle-flanges D D. For convenience in installing the derailer the side walls are extended a predetermined distance from the chamber proper, as shown by F', which distance is such that when the ends of the extensions are placed against the web of the rail the standard will then be in its proper position relative to the rail and may be secured in that position by spiking the same to the ties. The side walls are also cut away, as at F², to allow clearance for the ends of the derail-block proper when the latter is in its closed position, as shown by Fig. 4, and in this position the derail-block covers the open end of the chamber. In addition to their function as gages the side walls also subserve the reinforcement of the derail-block against movement along the rail, as will be presently described.

The wheel-derailing member 1 is formed of a single piece carrying at one end an integral derailing-block 2 and at the other means for connection, such as lugs 3 3, with the wires or pipes 4 4 of the operating system. The form of the derail-block is such that it will fit and rest on the top of the rail, and it is so shaped on its upper side that a wheel encountering it from one direction will be lifted and guided across the rail, while a wheel from the other direction will be only slightly lifted without being derailed. Manifestly the strains to which a block of this description and its support are subjected are both complex and violent. A frequent source of danger has hitherto been found to be present in the construction of derailers in that the sudden shock has resulted in dislodging the block from the rail before the wheel has been derailed; but in the construction of derailers herein described the liability of such accident is effectually avoided. To this end and to the end of reducing the energy required for operation to a minimum the derail-block arm is provided with a curved bearing-surface which slides on transverse supporting-surfaces on the standard in such manner that when the derailing member is moved toward the rail it first slides upwardly and then down onto the rail. The bearing-surface on the arm may be formed in various ways. In the form of Figs. 1 to 5 the surface is provided by a pair of channels or grooves 5 in opposite sides of the arm, engaging and sliding on the studs E E and E' E', which studs are preferably cast integral with the side walls F F.

In cases where the apparatus is to be located upon or between the ties or below the level of the rail-heads the forward pair of studs E E are disposed relatively higher than the rear pair. Preferably these relative heights are such that a plane common to both pairs will intersect or pass close to the rail-head.

The groove 5 comprises an upwardly-inclined portion 6, a reversely or downwardly inclined portion 7, and a rear portion 8, which is extended to the end of the arm, so that the assembly of the derailer consists simply in inserting the arm into the forward end of the chamber or space between the walls and sliding it back on the studs. The inclinations of the several portions of the groove are such that when the derailing member is moved to the left in Fig. 4 the forward portions 6 cause it to rise until the corners 6' pass the studs E, whereupon the member slides downwardly until it strikes and rests upon the rail. The return movement is obviously the reverse of that just described; but in both cases it will be observed that the effort required to effect a change of position is simply that required to slide the member up the inclined portions 6 or 7. After the corners 6' pass the studs the remainder of the movement is accomplished mainly by the weight of the member. The rear groove portions 8, which are engaged only by the rear studs E' E', are slightly curved to give a dip to the block as it moves, which is efficacious in relieving it of accumulations of dirt, snow, &c. The function of the rear studs is principally to prevent the block from missing the proper position upon the rail by excessive swinging on the forward studs; but they may, however, be omitted without departing from the scope of this invention, and the rigidity of the pipe connection 4 or other means may be relied upon in their stead. It is to be observed at this point that all downward pressure on the block when on the rail tends to settle it more securely thereon by virtue of the reverse or downward inclination of the groove-surface 7, which is a point of special distinction in this class of derailers over other types in which the blocks are held in position mainly by their operating connections or some special locking or holding element. The liability of accidental dislodgment or closing of derailer in the present construction is obviously impossible.

In order to reinforce the derail-block against movement along the rail, the standard and derailing member are respectively provided with complementary interlocking portions of great strength adapted to be mutually engaged when the derailer is open. In Figs. 1 to 5 the space between the side walls or extensions F' F', above described, is utilized as a recess, and a shoulder or projection 9 is formed in the arm of sufficient width to fit rather snugly in the recess or socket; but manifestly the socket can be formed on the arm and the shoulder on the standard, if desired, with equal effect. This thrust-sustaining recess is primarily in the nature of a reinforcement, as the disposition of the arm between the side walls F might of itself be sufficient to hold the derail-block against displacement; yet the considerable leverage afforded by the derail-block arm makes it unsafe to depend entirely upon them. It will be observed that when the derailers are encountered by wheels from one direction only it is manifestly not strictly necessary that the recess have two side walls. One alone, acting as an obstruction to the displacing movement, would be sufficient; but for general reasons the symmetrical construction shown is preferred.

The operating connections may be secured directly to the arm; but I prefer to provide the lugs 3 3, which are disposed parallel and side by side, and the operating as well as the locking mechanism of an interlocking system may be secured to them. The construction of the standards with inwardly-projecting studs or transverse supporting-surfaces permits of the same being made of the minimum length and also of uniform dimensions for all kinds of rails. The derail-block arms, which are all of similar shape, may be provided with grooves of different degrees of inclination, so that when assembled with the standards, which may be uniform, the apparatus will be adaptable to any given style or size of rail. The formation of the seat for taking the thrust of the block upon the standard instead of upon or in some separate part—such, for example, as the rail—also constitutes a most important feature of my invention, as thereby the danger arising from the displacement of the seat by expansion or contraction and the consequent failure of full throw on the part of the block is entirely avoided. The side walls of the seat are made comparatively thick for the purpose of rigidity and strength, and they may be further reinforced by the angle-flanges, shown adjacent to them in Figs. 2 and 3, and the cross-seat G, formed integral with the standard. The cross-seat is inclined downwardly at about the same angle as the inclined groove portion 7, and the shoulder on the arm is similarly inclined, so that when the two parts are in engagement their effect will be similar and auxiliary to the inclined groove 7 and will also help sustain the arm against downward strains. The addition of the cross-seat is of special benefit in modifications of the derailer where the arm is thin and not of itself capable of resisting the severe downward thrusts, as will be presently described.

Figure 6:
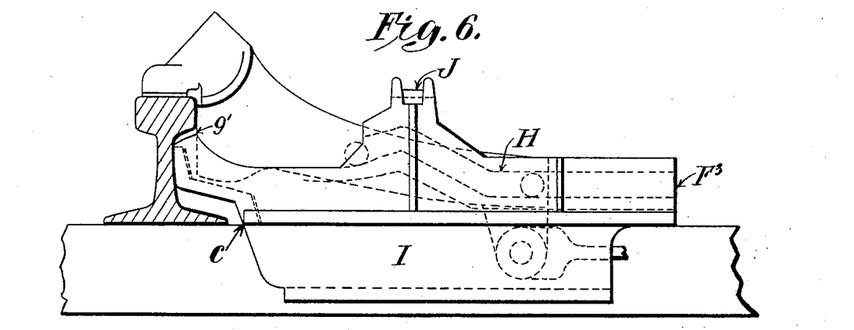
Fig. 6 is an elevation of another form embodying features of my invention, showing the derailer in open position.
Figure 7:
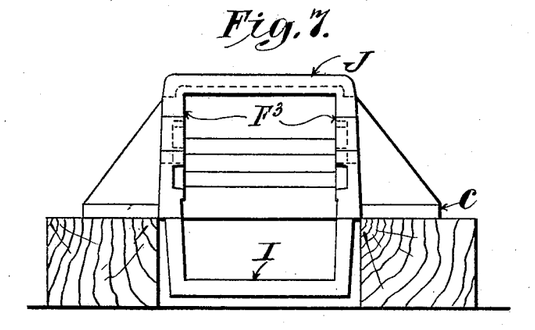
Fig. 7 is an end elevation of the standard of same.
Figure 8:
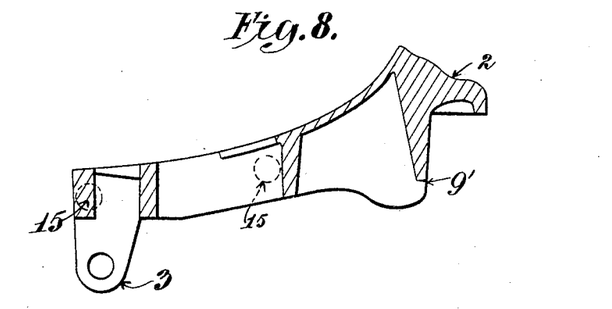
Fig. 8 is a longitudinal section view of the derailing member of Fig. 6, and Figs. 9 to 15 are modified forms of derailers embodying features of my invention.

Figs. 6, 7, and 8 represent a modified form of derailer embodying features of my invention in which the side walls $F^3$ of the standard member are somewhat longer than in the figures above discussed and are provided with inside curved grooves H of appropriate contour, such that the derail-block arm, supported by pins 15, engaging said grooves, will move up and over toward the rail in the manner now well known in the art and as above described. The bottom of the derail-block chamber is closed and depressed in this form, so as to extend between or below the ties, as indicated by I, and the side walls are reinforced by an integral cross-bar J. The extended side walls form, as before, a recess or socket for the shoulder on the arm; but the inclined seat G is omitted. The derail-block arm of this form may be made with open spaces for reducing its weight, as shown in Fig. 8, and the shoulder or projection 9' may be of any appropriate contour which will fit the recess.

Figure 9:
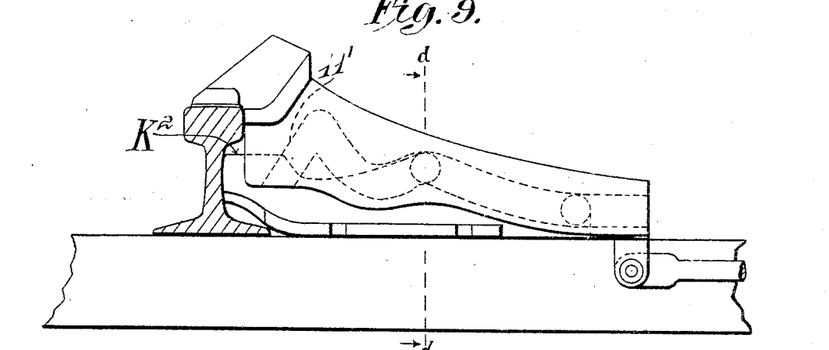
Figure 10:
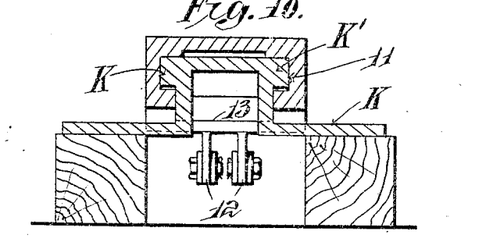
Figure 11:
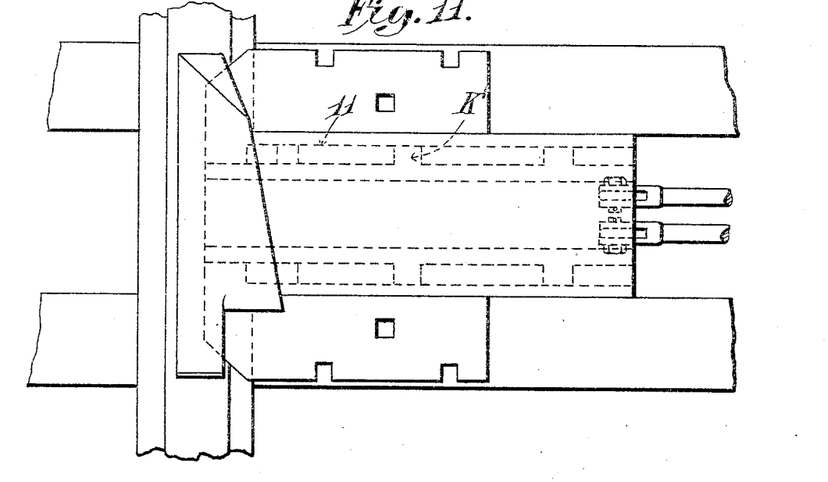

In Figs. 9, 10, and 11 the derail-block arm is hollow and surrounds and covers the standard K, which latter is provided with projecting studs K', working in internal grooves 11 in the arm. The socket member, which reinforces the block against movement along the rail, is afforded by the side walls of the hollow arm, which fit over a raised portion $K^2$ of the standard. The said raised portion constitutes also the gage extension for the apparatus as in the other figures, and the operating connections are secured to the lugs 12 on the cross-bar 13 at the rear of the arm. The derail-block of this modification may be unlimited in size without danger of striking the standard in the return movement, and the sliding surfaces of the two parts, as well as the thrust-socket, are effectually protected against clogging with dirt or snow. Furthermore, the top surface of the arm may be made horizontal, which will adapt it to street-railways when the apparatus is required to be flush with the surface of the pavement. When the lugs 12 are disposed pendent to a cross-bar on the end of the arm, the grooves 11' (shown in dotted lines) are provided for assembly.

Figure 1:
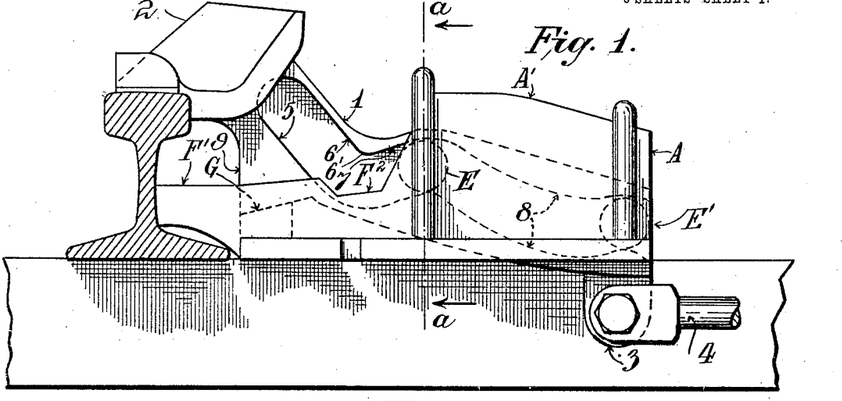
Figure 1 is a side elevation of the derailer in open or operative position and showing the rail in section.
Figure 2:
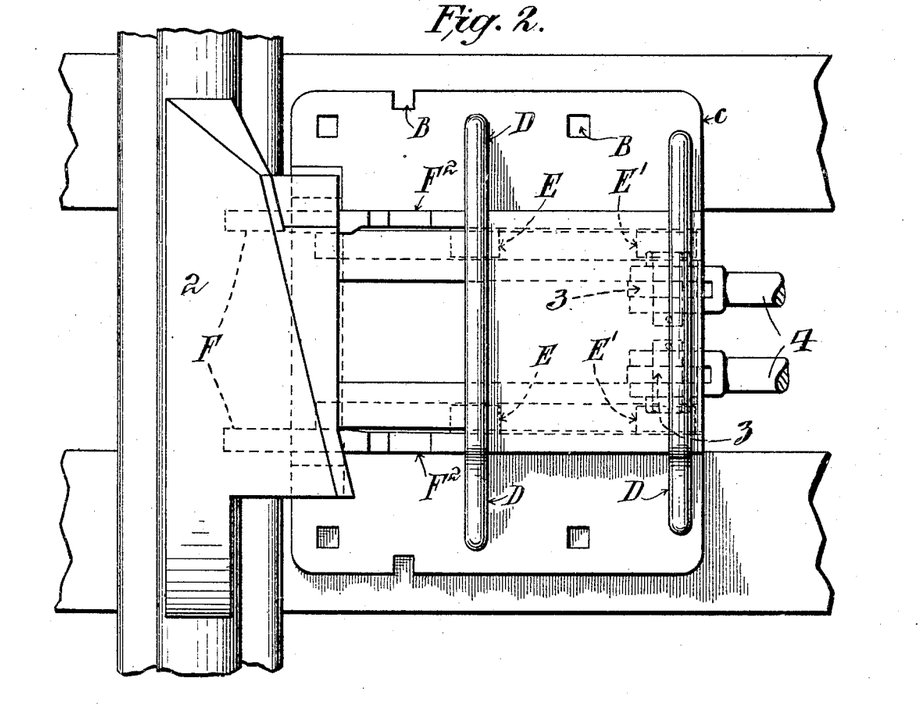
Fig. 2, a top plan of Fig. 1.
Figure 3:
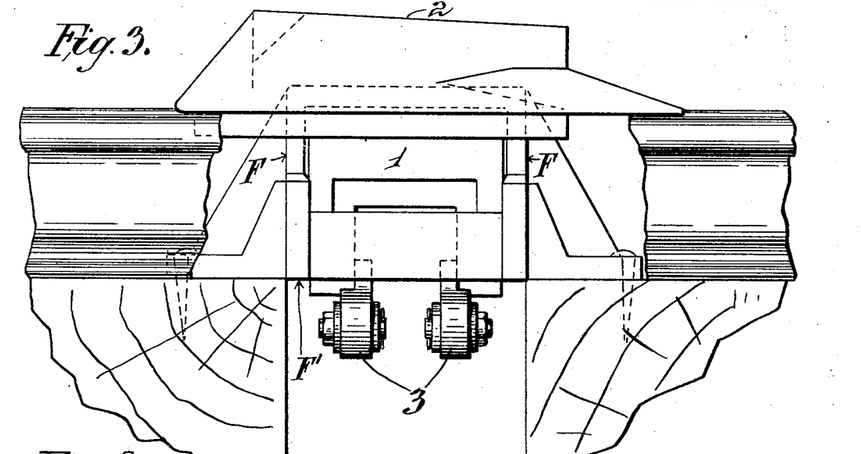
Fig. 3, an end elevation of Figs. 1 and 2 looking from the left and with a portion of the rail broken away.
Figure 12:
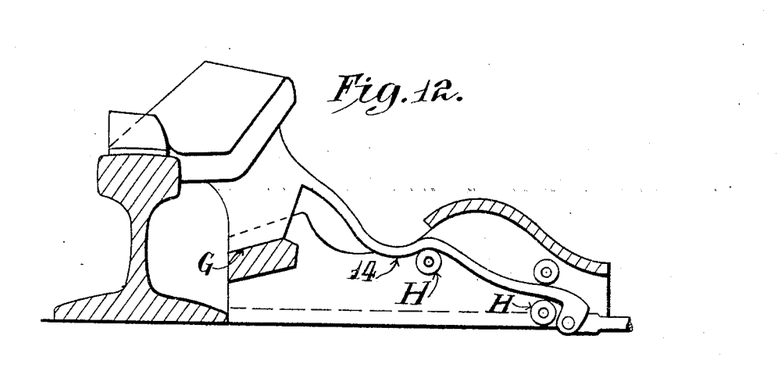

In Fig. 12 is shown a modified form in which the groove is omitted from the derail-block arm and the latter is curved like the bearing-surfaces of the groove 5 of Fig. 1 and supported upon transverse rods H, which may conveniently take the form of rollers. Inasmuch as the standard is provided with the seat G and the arm is therefore not required to withstand the severe thrusts of the car-wheels, it is possible to make the arm comparatively thin, as shown, and thereby reduce the height of the standard a proportionate amount. The principle of operation, however, is of course the same as that already described. To some extent the curved inclined portion 14 of the arm serves, in conjunction with the inclined seat G, the same purpose as described in connection with the preceding figures.

Figure 13:
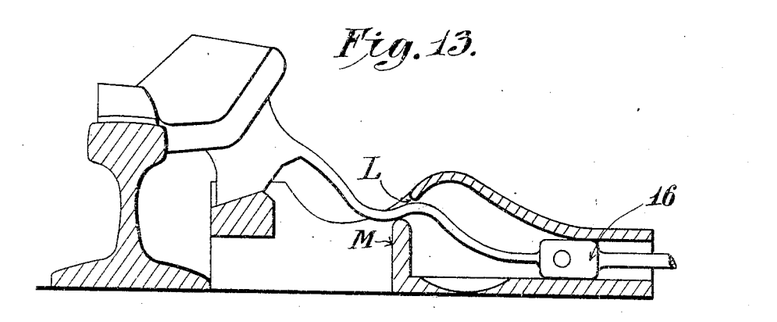

In Fig. 13 the arm is also thin and without a groove, being supported in the opening L of the chamber. The rear end of the chamber is contracted and straight to form a way in which the coupling-head 16 is adapted to slide. The end of the arm is connected to the head, and the arm itself is curved, as in Fig. 12, so that movement of the head will cause the derail-block to move up, over, and down toward the rail.

In both of the above figures the standard is provided with the socket and cross-seat G to take the downward thrust and relieve the arm of strain, and in these forms the side walls are of sufficient length to reach only to the edge of the rail-flange, but nevertheless act as gages for proper installing in the same manner as the extensions F' F'. Both parts or members are integral castings forming a two-piece derailer.

Figure 14:
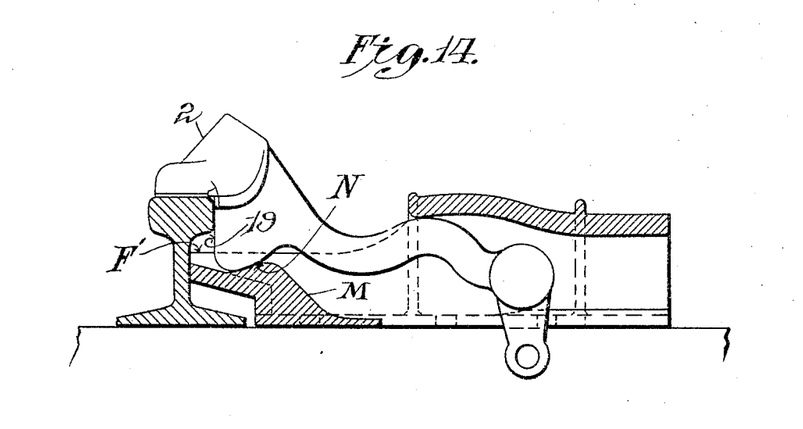
Figure 15:
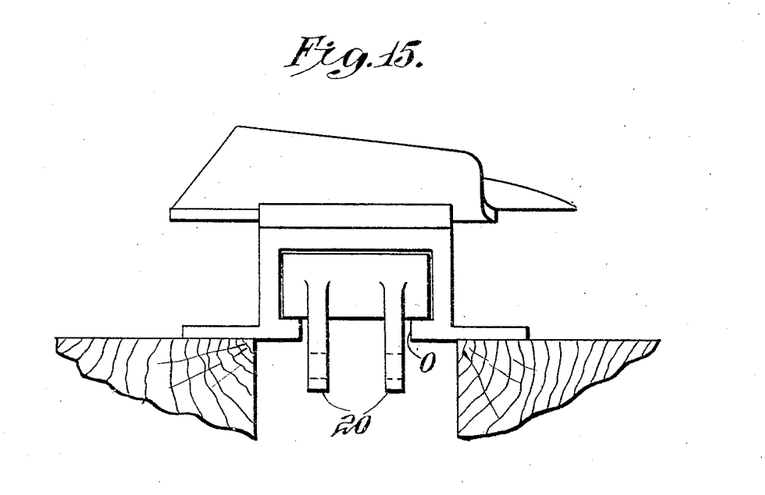

In Figs. 14 and 15 the derailer illustrated has the up-and-over movement of the preceding forms; but it is secured in a slightly different manner. The derail-block arm, although so shown, is not necessarily curved and may obviously be straight and this without serious difficulty. The shoulder 19 of this form rides along the inclined bottom or floor of the chamber, the portions M N of which give it the vertical component of movement, and no other sliding surfaces are required. The portion N provides a seat for the derail member conformable to seat G of the preceding figures, and the side walls F' F' are present in this form, as before, also acting as gages. The rear portion of the arm is made slightly enlarged, as shown in Fig. 15, which is a rear view, so as to fit in the more or less contracted rear portion of the chamber. Lugs 20 20 are formed on the end of the arm projecting below the standard, so that the point of connection will be substantially in alinement with the general direction of movement of the arm. The parts are assembled by inserting the lug end of the arm in the chamber and sliding it back, with the lugs protruding through the longitudinal slot O in the floor of the chamber. The modifications of the other standards may also be applied in obvious manners to this form.

I claim—

1. A derailing device comprising a standard independent of the rail and a member supported thereby and guided to move in a definite path toward and from the rail, said member being adapted to be encountered by a moving wheel for derailing the same, in combination with a portion of said standard projecting as a wall or lug therefrom adjacent said member when in its operative position and adapted to reinforce the same against movement with said wheel.

2. A derailing device comprising a standard member and a movable wheel-derailing member supported thereby and guided to move in a definite path toward and from the rail, a recess in one member at a point thereon nearest the rail and a portion on the other complementary to said recess and adapted to fit therein, whereby the movable member is sustained against movement parallel with the track.

3. A derailing device comprising a supporting member, a wheel-derailing member sliding thereon and provisions whereby the latter is constrained to move in a curved path toward the rail, in combination with complementary thrust-sustaining portions respectively on each of said members, whereby the wheel-derailing member is sustained against movement parallel with the track.

4. A derailing device comprising a supporting member and a wheel-derailing member guided thereby to move toward and down upon the rail, in combination with complementary thrust-sustaining portions respectively on each of said members adapted to engage one another when the wheel-derailing member is nearest the rail, whereby movement of the derailing member along the rail is prevented.

5. A derailing device comprising a standard and a wheel-derailing member slidably mounted thereon to move upward, over and down toward the rail, in combination with a recess in the standard and a projection on the said member adapted to enter the recess and hold the member against movement by the wheel which encounters it.

6. A derailing device composed of a single casting formed as a standard or base member to be permanently secured to the roadway, a wheel-derailing member slidably mounted thereon to move toward and from the rail, in combination with complementary thrust-sustaining portions respectively on said members, engaged when the wheel-derailing member is nearest the rail, whereby said member is reinforced against movement parallel with the rail.

7. A derailing device comprising a base member, a wheel-derailing member and means for supporting and guiding said last-named member upon the former, whereby it is permitted to move toward and down upon the rail, in combination with auxiliary means for supporting said wheel-derailing member consisting of an inclined surface on one of the members adapted to be engaged by the other member and tending to cause said wheel-derailing member to move toward the rail.

8. A derailing device comprising a base member, a wheel-derailing member and supporting and guiding means whereby the latter is constrained to move upon the former, toward and downwardly upon the rail, in combination with auxiliary means for supporting and guiding said member consisting of an inclined surface provided by the base member adjacent the rail and adapted to be engaged by the wheel-derailing member, whereby downward pressure upon the same will tend to force it firmly into its seated or operative position upon the rail.

9. A derailing device composed of a single casting formed as a standard to be permanently secured to the roadway, a one-piece wheel-derailing member slidably mounted thereon and provided with an integral shoulder, in combination with a recess formed in the standard-casting in the path of said shoulder and adapted to receive the same when the wheel-derailing member is nearest the rail.

10. A derailing device comprising a standard and a wheel-derailing member slidably mounted thereon to move toward and down upon the rail, in combination with inclined seating-surfaces respectively on the standard and said member, the plane of contact of said surfaces being inclined downwardly toward the rail.

11. A derailing device comprising a base member and a wheel-derailing member, movable thereon toward and from the rail, in combination with a recess formed in one member with an inclined bottom and a complementary projection on the other member adapted to engage said inclined bottom when in operative position.

12. A derailing device comprising a standard and a wheel-derailing member slidably mounted thereon to move up, over and down toward the rail, in combination with an inclined seating-surface on the standard disposed across the path of the said member adjacent the rail and adapted to support said member only when in its operative position.

13. In a derailing device, a standard provided with opposite transverse studs thereon and a sliding wheel-derailing member supported thereby, in combination with curved grooves in the opposite sides of said sliding member engaged by said studs and formed to give a vertical component to the movement of the said member toward the rail.

14. In a derailing device, a standard comprising side walls, a derailing member comprising an arm extending between said walls, in combination with projecting studs on said walls and a groove in the arm engaged thereby, said groove being curved to give a vertical component to the movement of the derailing member toward the rail.

15. In a derailing device, a standard comprising side walls, a derailing member comprising an arm extending between said walls, in combination with projecting studs on said walls and a groove in the arm engaged thereby, said groove being curved to give a vertical component to the movement of the derailing member toward the rail, and a connecting-lug on said arm in line with the general direction of said curved groove.

16. In a derailing device, a standard comprising side walls, a derailing member comprising a supporting-arm extending between said walls, in combination with inwardly-projecting studs on said walls and grooves in the arm engaged thereby, said grooves being provided with upwardly and downwardly inclined portions to give an up, over and down motion to the movement of said member toward the rail.

17. In a derailing device, a standard formed as a chamber opening toward the rail and having a closed protecting-roof, in combination with a derail-block and an arm extending therefrom into said chamber and supported therein to move toward and from the rail.

18. In a derailing device, a wheel-derailing member mounted to move toward and from the rail, a standard stationary with respect to the rail, provided with means for supporting said member and predetermined as to length whereby it abuts against the rail when in proper position with respect thereto.

19. In a derailing device, a wheel-derailing member suitably mounted to move toward and from the rail, a standard provided with means for supporting said member and with extensions acting as gages for the proper positioning of said device with respect to said rail.

20. In a derailing device, a wheel-derailing member suitably mounted to move toward and from the rail, a standard stationary with respect to the rail and provided with side walls and means for supporting said member, in combination with extended portions of said side walls acting as gages for the proper positioning of the device with respect to the rail.

21. In a derailing device, a standard having a base-flange adapted to be secured to the ties, and a movable derailing member mounted on said standard, in combination with an extension of said standard disposed above the plane of said base-flange and abutting against the web of the rail.

22. In a derailing device, a standard having opposite side walls and a wheel-derailing member supported on said standard to move toward and from the rail, in combination with an extension from each side wall engaging the web of the rail and acting as gages for the proper positioning of the standard with respect to the rail.

23. In a derailing device, a standard and a wheel-derailing member mounted to move thereon toward the rail, in combination with extended side walls for said standard acting as gages, and a recess formed between said extended walls for receiving a part of said derailing member.

24. In a derailing device, a wheel-derailing member comprising a derail-block and an arm, a standard comprising a chamber with a closed roof and means for slidably supporting said arm therein, in combination with means for retracting said arm and block whereby the latter may serve as a cover for said open end of the chamber.

25. In a derailing device, a wheel-derailing member comprising an arm, a standard comprising a chamber with an open end for containing said arm and means for slidably supporting the same therein, in combination with a derail-block on said arm and the recesses $F^2$ on said standard, whereby the derail-block will serve as a cover for said open end of the chamber when in closed position.

26. In a derailing device, a standard comprising side walls and a wheel-derailing member slidably supported thereon, in combination with end portions of said side walls reduced in vertical dimension and extended to abut against the rail, thereby acting as gages.

27. A derailer comprising a base provided with a chamber and a transverse supporting member extending across the same, in combination with a derail-block, an arm thereon slidably mounted on the transverse member and curved throughout its sliding portion to give a vertical component to the movement of the derail-block toward the rail.

28. A derailer comprising a base provided with a chamber and a transverse supporting member extending across the same, in combination with a derail-block, a comparatively thin arm extending therefrom into said chamber and slidably mounted on said transverse member.

29. A derailer comprising a base provided with a chamber and a supporting member extending across the same, in combination with a derail-block, a comparatively thin arm extending therefrom and slidably mounted on said transverse member and complementary thrust-sustaining portions on said arm and base.

30. A derailer comprising a base provided with a chamber having a transverse supporting member extending across the same, a derail-block and a comparatively thin arm carrying the same and extending therefrom into said chamber and supported to slide therein, in combination with an inclined cross-seat on said base and a corresponding portion on the derail-block adapted to engage said cross-seat.

In testimony whereof I have signed my name to the specification, in the presence of two subscribing witnesses, February 1, 1904.

STANLEY W. HAYES.

Witnesses:
H. G. KIMBALL,
JOHN J. McELHINNY.